(12) United States Patent
Wang et al.

(10) Patent No.: US 9,460,103 B2
(45) Date of Patent: Oct. 4, 2016

(54) FILE SYNCHRONIZATION METHOD, FILES SYNCHRONIZATION APPARATUS AND ELECTRONIC DEVICE

(75) Inventors: Tianshu Wang, Beijing (CN); Rong Yang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 309 days.

(21) Appl. No.: 14/003,314
(22) PCT Filed: Mar. 6, 2012
(86) PCT No.: PCT/CN2012/071973
§ 371 (c)(1),
(2), (4) Date: Sep. 5, 2013

(87) PCT Pub. No.: WO2012/119539
PCT Pub. Date: Sep. 13, 2012

(65) Prior Publication Data
US 2013/0339296 A1    Dec. 19, 2013

(30) Foreign Application Priority Data
Mar. 7, 2011   (CN) .......................... 2011 1 0053811

(51) Int. Cl.
*G06F 17/30* (2006.01)
*H04L 29/08* (2006.01)

(52) U.S. Cl.
CPC ..... *G06F 17/30174* (2013.01); *H04L 67/1095* (2013.01)

(58) Field of Classification Search
CPC .................. G06F 17/30575; G06F 17/30386; G06F 17/30067; H04L 67/1095
USPC ................................................. 707/610–614
See application file for complete search history.

(56) References Cited

U.S. PATENT DOCUMENTS

| | | | |
|---|---|---|---|
| 7,660,831 B2 * | 2/2010 | Freedman | 707/621 |
| 2008/0168106 A1 * | 7/2008 | Freedman | 707/201 |
| 2009/0198772 A1 * | 8/2009 | Kim et al. | 709/203 |
| 2010/0107104 A1 * | 4/2010 | Bruce et al. | 715/772 |

FOREIGN PATENT DOCUMENTS

| | | |
|---|---|---|
| CN | 101094026 A | 12/2007 |
| CN | 101331741 A | 12/2008 |
| CN | 101860470 A | 10/2010 |

OTHER PUBLICATIONS

Agarwal et al., On the scalability of data synchronization protocols for PDAs abd Mobile Devices, 2002, IEEE, 1-14.*
International Search Report for corresponding International Application No. PCT/CN2012/071973, mailed May 24, 2012 (4 pages).
Written Opinion for corresponding International Application No. PCT/CN2012/071973, mailed May 24, 2012 (5 pages).

* cited by examiner

*Primary Examiner* — Jean B Fleurantin
(74) *Attorney, Agent, or Firm* — Schwegman Lundberg & Woessner, P.A.

(57) ABSTRACT

A file synchronization method may comprise establishing a connection with a second electronic device and performing a first synchronization operation and/or a second synchronization operation. The first synchronization operation may comprise interacting with the second electronic device to synchronize a first synchronization file from the second electronic device to the first electronic device, and to record a first piece of file source information for the first synchronization file, wherein the first piece of file source information is to identify that the first synchronization file comes from the second electronic device. The second synchronization operation may comprise selecting a second synchronization file from the first electronic device, and interacting with the second electronic device to synchronize the second synchronization file to the second electronic device, wherein the second synchronization file includes a second piece of file source information to identify that the second synchronization file corresponds to the second electronic device.

15 Claims, 2 Drawing Sheets

FILE SYNCHRONIZATION METHOD, FILES SYNCHRONIZATION APPARATUS AND ELECTRONIC DEVICE

CROSS REFERENCE TO RELATED APPLICATIONS

This is a national stage application of PCT/CN2012/071973, filed on Mar. 6, 2012, which claims priority of Chinese Patent Application No. CN 201110053811.4, filed on Mar. 7, 2011. This application claims the benefits and priority of these prior applications and incorporates the disclosures of these prior applications by reference in their entirety.

TECHNICAL FIELD

The present disclosure relates to synchronization processes of files, and more particularly, to a file synchronization method, a file synchronization apparatus and an electronic device.

BACKGROUND OF THE INVENTION

With popularity of various electronic devices, a user may own more and more electronic devices. For example, the user may own electronic devices such as a mobile phone, a desktop computer, a PAD, a notebook computer and the like, but these electronic devices may have different application situations respectively. For example, the mobile phone, the PAD or the like may often be used in a moving situation (e.g. on a bus), while the desktop computer may mostly be used in a fixed situation such as home or an office. Also, the various devices may have different usage comfortableness. For example, with the desktop computer, the user is able to watch a film and read a novel more comfortably.

Due to different characteristics of the above various electronic devices and the user's mobility, synchronization among the electronic devices is desirable for the user. For example, contents newly downloaded to the desktop computer may be synchronized to the mobile electronic device. Or, because the desktop computer or the notebook computer may have a separate and relatively large keyboard, the user may need to synchronize an address book from the mobile phone to the notebook computer for storage or modification.

The inventors have found that there are at least following disadvantages in the related art.

According to existing methods for synchronization, generally all synchronization files are copied completely and then saved locally. Such synchronization methods are difficult to manage and also ineffective. For example, when there are a great deal of synchronization files, it takes much time for transmission, but actually the user may need only some of these files. In such a situation, the synchronization efficiency is very low, and it takes much time to obtain few files that are actually wanted.

Further, according to the existing synchronization methods, one electronic device can synchronize with only one further device. Files in the one electronic device cannot keep synchronization with those in a plurality of other electronic devices. This will be described in detail by an example as follows.

Assume that a device A has a music synchronization file folder, in which ten songs previously synchronized from a device B to the device A are stored. At this time, if the device A is further synchronized with another device C to obtain other songs in the device C, the ten songs in the device A will be deleted, and finally there are only songs synchronized from the device C to the device A.

BRIEF SUMMARY OF THE INVENTION

According to an aspect of the present disclosure, there is provided a file synchronization method for a first electronic device, the method comprising: establishing a connection with a second electronic device; and performing a first synchronization operation and/or a second synchronization operation. The first synchronization operation may comprise: interacting with the second electronic device so as to synchronize a first synchronization file from the second electronic device to the first electronic device, and to record a first piece of file source information for the first synchronization file, wherein the first piece of file source information is configured to identify that the first synchronization file comes from the second electronic device. The second synchronization operation may comprise: selecting a second synchronization file from the first electronic device, and interacting with the second electronic device, so as to synchronize the second synchronization file to the second electronic device, wherein the second synchronization file includes a second piece of file source information configured to identify that the second synchronization file corresponds to the second electronic device.

According to an embodiment, the file source information for local synchronization files in the first electronic device may comprise an electronic device identifier. Selecting the second synchronization file from the first electronic device may comprise: obtaining a second identifier of the second electronic device; and determining, as the second synchronization file, a synchronization file among the local synchronization files whose file source information comprises the second identifier.

According to an embodiment, the file source information for local synchronization files in the first electronic device may comprise an electronic device identifier. Selecting the second synchronization file from the first electronic device may comprise: obtaining a second identifier of the second electronic device and a first time when a previous synchronization is performed with the second electronic device; obtaining third synchronization files among the local synchronization files whose file source information comprises the second identifier, and a latest modification time of each of the third synchronization files; and determining, as the second synchronization file, a synchronization file from the third synchronization files whose latest modification time is later than the first time.

According to an embodiment, the synchronization file may have an attribute field for recording an attribute of the file, the file source information may comprise the file attribute, and the electronic devices each may have a device attribute. Selecting the second synchronization file from the first electronic device may comprise: obtaining the device attribute of the second electronic device; and determining, as the second synchronization file, a synchronization file among local synchronization files whose file attribute matches the device attribute of the second electronic device.

According to an embodiment, interacting with the second electronic device so as to synchronize the first synchronization file from, the second electronic device to the first electronic device, and to record the first piece of file source information for the first synchronization file may comprise: interacting with the second electronic device so as to obtain a second identifier of the second electronic device and the first synchronization file; and saving the first synchronization file, and recording a correspondence between the first synchronization file and the second identifier.

According to an embodiment, the first synchronization operation may comprise: performing the first interacting operation with the second electronic device to determine a size of the first synchronization file; determining whether a remaining storage capacity of a storage module for storing the synchronization files is larger than or equal to the size of the first synchronization file; directly synchronizing the first synchronization file from the second electronic device to the first electronic device and recording the first piece of file source information, when the remaining storage capacity is larger than or equal to the size of the first synchronization file; and deleting a part or all of the synchronization files existing in the storage module according to a preset policy until the remaining storage capacity is larger than or equal to the size of the first synchronization file, and subsequently synchronizing the first synchronization file to the first electronic device and recording the first piece of file source information, when the remaining storage capacity is less than the size of the first synchronization file.

According to an embodiment, the preset policy may comprise: preferentially deleting a file earliest synchronized to the first electronic device, according to a temporal order of being synchronized to the first electronic device; or preferentially deleting a file least frequently used, according to a usage frequency of the synchronization files; or preferentially deleting a file whose source electronic device has a lowest priority, according to priorities of source electronic devices of the synchronization files.

According to an embodiment, the synchronization files each may have a respective piece of reservation information for identifying whether the synchronization file needs to be reserved or not, and synchronization file(s) deleted in the operation of deleting the part or all of the synchronization files existing in the storage module according to the preset policy may comprise a file whose reservation information indicates that the file needs not to be reserved.

According to an embodiment, the method may further comprise: recording synchronization information of the current synchronization operation after the synchronization is completed.

According to a further aspect of the present disclosure, there is provided a file synchronization apparatus for use in a first electronic device. The file synchronization apparatus may comprise: a connection establishment module, configured to establish a connection with a second electronic device; and a synchronization module, configured to interact with the second electronic device so as to synchronize a first synchronization file from the second electronic device to the first electronic device, and to record a first piece of file source information for the first synchronization file, wherein the first piece of file source information is configured to identify that the first synchronization file comes from the second electronic device; and/or select a second synchronization file from the first electronic device, and interact with the second electronic device, so as to synchronize the second synchronization file to the second electronic device, wherein the second synchronization file includes a second piece of file source information configured to identify that the second synchronization file corresponds to the second electronic device.

According to an embodiment, the file source information for local synchronization files in the first electronic device may comprise an electronic device identifier. A module for selecting the second synchronization file from the first electronic device may comprise: a first obtaining unit, configured to obtain a second identifier of the second electronic device; and a first determination unit, configured to determine, as the second synchronization file, a synchronization file among the local synchronization files whose file source information comprises the second identifier.

According to an embodiment, the file source information for local synchronization files in the first electronic device may comprise an electronic device identifier. A module for selecting the second synchronization file from the first electronic device may comprise: a second obtaining unit, configured to obtain a second identifier of the second electronic device and a first time when a previous synchronization is performed with the second electronic device; a third obtaining unit, configured to obtain third synchronization files among the local synchronization files whose file source information comprises the second identifier, and a latest modification time of each of the third synchronization files; and a second determination unit, configured to determine, as the second synchronization file, a synchronization file from the third synchronization files whose latest modification time is later than the first time.

According to an embodiment, the synchronization file may have an attribute field for recording an attribute of the file, the file source information may comprise the file attribute, and the electronic devices each may have a device attribute. A module for selecting the second synchronization file from the first electronic device may comprise: a fourth obtaining unit, configured to obtain the device attribute of the second electronic device; and a third determination unit, configured to determine, as the second synchronization file, a synchronization file among local synchronization files whose file attribute matches the device attribute of the second electronic device.

According to an embodiment, the synchronization apparatus may further comprise: a synchronization information recording module, configured to record synchronization information of the current synchronization operation after the synchronization is completed.

According to a still further aspect of the present disclosure, there is provided an electronic device, comprising: a connection establishment module, configured to establish a connection with a further electronic device; a storage module; and a processor including a first synchronization module and/or a second synchronization module. The first synchronization module may be configured to interact with the further electronic device via a connection established by the connection establishment module so as to synchronize a first synchronization file from the further electronic device to the storage module, and to record a first piece of file source information for the first synchronization file, wherein the first piece of file source information is configured to identify that the first synchronization file comes from the further electronic device. The second synchronization module may be configured to select a second synchronization file from the storage module, and interact with the further electronic device via the connection established by the connection establishment module, so as to synchronize the second synchronization file to the further electronic device, wherein the second synchronization file has a second piece of file source information configured to identify that the second synchronization file corresponds to the further electronic device.

According to embodiments of the present disclosure, there can be following advantages.

According to the embodiments of the present disclosure, during synchronization with the second electronic device, the file source identifier may be set for the synchronization file. Thus, synchronization files in the first electronic device whose file source identities are different from the device identifier of the second electronic device may be kept unchanged, so that they will not be deleted due to the synchronization and thus the electronic device may be kept synchronization with a plurality of electronic devices.

According to the embodiments of the present disclosure, the synchronization files have the file source information. During the synchronization, the file source information for the file which is synchronized to the local device may be recorded. The synchronization file for synchronization to the remote device may be selected according to the file source information. Thus, the problem of low file transmission efficiency caused by the requirement of copying all of the synchronization files may be addressed.

DETAILED DESCRIPTION

Figure 1:
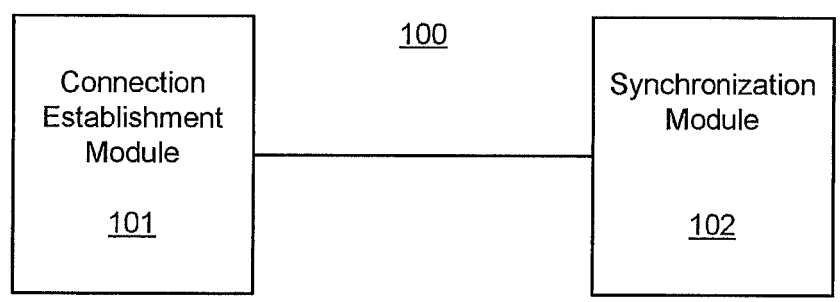
FIG. 1 is a schematic diagram showing a file synchronization apparatus according to an embodiment of the present disclosure.

According to aspects of the present disclosure, there are provided a file synchronization method, a file synchronization apparatus and an electronic device (hereinafter, a first electronic device). According to some embodiments, a synchronization file may have a piece of file source information. During synchronization, a file which is synchronized to a local device may have its file source information recorded. A file for synchronization to a remote device may be selected based on the file source information. Thus, the problem of low file transmission efficiency caused by the requirement of copying all of the synchronization files can be addressed.

Before detailed descriptions of embodiments of the present disclosure, the "synchronization file" concerned in the embodiments of the present disclosure may be illustrated firstly so as to better understand the embodiments of the present disclosure.

In the embodiments of the present disclosure, the first electronic device may interact with a second electronic device for transmission of the synchronization file. In this case, the synchronization file sent from the first electronic device to the second electronic device during the synchronization is a file selected from a set of files capable of being synchronized. With respect to file(s) in the file set which is/are not selected in the current synchronization, it/they may be selected as synchronization file(s) when the first electronic device synchronizes with electronic device(s) other than the second electronic device.

Which files are synchronization files may be selected according to user's options. For example, only address book files are synchronization files when the user instructs to synchronize an address book. In this case, operation system files and other application data files are not synchronization files. Further, when the user selects to synchronize the system files, all the operating system files are synchronization files.

According to an embodiment of the present disclosure, a file synchronization method for a first electronic device may comprise: establishing a connection with a second electronic device; and performing a first synchronization operation and/or a second synchronization operation.

The first synchronization operation may comprise: interacting with the second electronic device so as to synchronize a first synchronization file from the second electronic device to the first electronic device, and to record a first piece of file source information for the first synchronization file, wherein the first piece of file source information is configured to identify that the first synchronization file comes from the second electronic device.

The second synchronization operation may comprise: selecting a second synchronization file from the first electronic device, and interacting with the second electronic device, so as to synchronize the second synchronization file to the second electronic device, wherein the second synchronization file includes a second piece of file source information configured to identify that the second synchronization file corresponds to the second electronic device.

According to an embodiment of the present disclosure, during interaction with the second electronic device, the file source information may be recorded for the synchronization file synchronized from the second electronic device, so as to identify that this synchronization file comes from the second electronic device. Further, the first electronic device may also need to synchronize its local synchronization file(s) to the second electronic device.

According to an embodiment of the present disclosure, in the first synchronization operation, the first electronic device may interact with the second electronic device, and save the first synchronization file after the first synchronization file is obtained from the second electronic device. Additionally, the first piece of file source information for the first synchronization file may be recorded for identifying that the first synchronization file comes from the second electronic device.

According to an embodiment of the present disclosure, there can be at least two situations for the first synchronization file.

1. The first synchronization file does not exist in the first electronic device, i.e., the first synchronization file has never been synchronized to the first electronic device previously.

2. The first synchronization file exists in the first electronic device, but has been modified. The modification may be a modification in the second electronic device (in which case the file having existed in the first electronic device needs to be updated to the modified one in the second electronic device), and may be a modification in the first electronic device (in which case the modified file in the first electronic device needs to be restored to an original one in the second electronic device).

In the first situation, the first electronic device may save the first synchronization file, and may set the file source information for the first synchronization file as a device identifier of the second electronic device after the device identifier is obtained.

In the second situation, the first electronic device may replace the existed first synchronization file with the first synchronization file obtained by the synchronization, so as to update/restore the first synchronization file. However, the file source information for the first synchronization file does not need to be modified at this time, and can be kept unchanged.

According to an embodiment of the present disclosure, during the synchronization with the second electronic device, a synchronization file whose file source identifier is different from the device identifier of the second electronic device may be kept unchanged, so as not to be deleted due to the synchronization process.

In the second synchronization operation, the second synchronization file may be selected according to the file source information. According to an embodiment of the present disclosure, the file source information may comprise an electronic device identifier.

The synchronization files in the first electronic device may come from different electronic devices. The file source information for the local synchronization files in the first electronic device may comprise electronic device identifiers. Selecting the second synchronization file from the first electronic device may comprise: obtaining a second identifier of the second electronic device; and determining, as the second synchronization file, a synchronization file among the local synchronization files whose file source information comprises the second identifier.

According to an embodiment of the present disclosure, the device identifier of the second electronic device (which uniquely identifies the second electronic device) may be utilized for setting the file source information, selecting the synchronization file and the like. During establishment of the connection between the first electronic device and the second electronic device, the first electronic device and the second electronic device can exchange information with each other. Thus, the device identifier of the second electronic device may be obtained during the establishment of the connection.

There can be such an example as follows.

Assume that an electronic device A including synchronization files which come from a plurality of electronic devices B1, B2 and B3. In this case, assume that there are a plurality of synchronization files X1, X2, X3, X4 and X5 in the electronic device A. Specifically, the synchronization file X1 comes from the electronic device B1; the synchronization files X2 and X3 come from the electronic device B2; and the synchronization files X4 and X5 come from the electronic device B3.

At this point, a correspondence between the local synchronization files in the first electronic device and the electronic device identifiers is shown in a table below.

| File Identifier | Electronic Device Identifier |
|---|---|
| X1 | B1 |
| X2 | B2 |
| X3 | B2 |
| X4 | B3 |
| X5 | B3 |

Assume that the electronic device A begins to synchronize with the electronic device B2. Firstly, the electronic device identifier B2 may be obtained. Then, synchronization files corresponding to B2, i.e., the synchronization files X2 and X3, may be selected among all of the synchronization files X1, X2, X3, X4 and X5.

Then, the synchronization files X2 and X3 may be synchronized to B2.

According to the embodiment of the present disclosure, only two files need to be synchronized. As a result, it is possible to save time and improve efficiency as compared with the related art where all the five files need to be synchronized.

In the situation illustrated above, the synchronization files in the first electronic device come from different electronic devices, and need to be synchronized to only the corresponding electronic devices during the synchronization. In a further situation, the synchronization files may not come from different electronic devices, but need to be synchronized to different electronic devices. In this case, the file source information for the local synchronization files in the first electronic device may also comprise the electronic device identities, and selecting the second synchronization file from the first electronic device may comprise: obtaining a second identifier of the second electronic device; and determining, as the second synchronization file, a synchronization file among the local synchronization files whose file source information comprises the second identifier.

In this situation, a manner in which the file source information is obtained may be different from that in the above situation. In the above situation, because the file itself comes from another electronic device, the file source information for the file may be set directly as the electronic device identifier of the sender when the file is synchronized to the local device. However, in this situation, it is possible that the file originally exists in the local device. Therefore, it is necessary to set the file source information for the file to be an electronic device identifier, indicating which electronic device the file corresponds to, and which electronic device the file needs to be synchronized to. Subsequent operations can be the same as those in the above embodiment.

Now, an example for this situation is illustrated in the following.

Assume that the electronic device B1 is a PAD of the user, the electronic device B2 is an office computer of the user, the electronic device B3 is a home computer of the user, and the electronic device A is a mobile phone of the user. At this point, the user downloads some materials related to his work and some music by the mobile phone on the way to his office, and set the file source information for the materials related to his work as B2, and the file source information for the music files as B3. After the user arrives at the office, when a synchronization connection between the mobile phone and the office computer is established, the mobile phone may automatically synchronize only the downloaded materials, but not all of the files, to the office computer. Thus, the efficiency of the synchronization may be improved.

Of course, determination of the synchronization file according to the file source information can be implemented in other manners. For example, the file may have an attribute field set for recording an attribute of the file. The file source information may be set as the file attribute recorded in the attribute field, and the file attribute may correspond to a device attribute of the electronic device.

In this case, selecting the second synchronization file from the first electronic device may comprise: obtaining the device attribute of the second electronic device; and determining, as the second synchronization file, a synchronization file among the local synchronization files whose file attribute matches the device attribute of the second electronic device.

There can be such an example as follows.

Assume that there are a plurality of synchronization files X1, X2, X3, X4 and X5 in the electronic device A. Specifically, the synchronization file X1 has a file attribution of "Work"; and the synchronization files X2 and X3 each have a file attribution of "Entertainment."

When the user arrives at the office and the connection between the electronic device A and the office computer is established, the device attribute of the office computer is Work, and thus only the file attribute (Work) of the synchronization file X1 is identical with the device attribute (Work) of the office computer. Thus, the electronic device A may automatically synchronize only the synchronization file X1, but not all of the files, to the office computer. As a result, the efficiency of the synchronization may be improved.

With respect to the match between the file attribute and the device attribute, "identical" as described above is only illustrative, and other relationships are possible as long as they are preset. For example, the attribute of the home computer can be set as Entertainment, the file attribute of the music files can be set as Music, and the attribute of a video file about a ball game can be set as Sport. As long as the Entertainment attribute is preset to match with Music and Sport, the video file of the ball game and the music files may be synchronized to the electronic device whose attribute is Entertainment after the synchronization connection is established.

The above descriptions are in terms of a single file, it may also be implemented by naming a file, and/or naming a folder. The difference only consists in objects to be compared, and the descriptions thereof are omitted here.

In the above processes, all of the synchronization files corresponding to the second electronic device may be synchronized to the second electronic device. Generally, however, there may be also following cases.

Some files have been synchronized to the second electronic device during a previous synchronization, and have not been changed before the current synchronization. If these files are synchronized to the second electronic device again, the synchronization efficiency will also be reduced. Thus, according to an embodiment of the present disclosure, only the synchronization files, whose file source identifiers correspond to the electronic device and which have been changed, are synchronized, in order to further improve the synchronization efficiency.

In this case, the file source information for the local synchronization file in the first electronic device may comprise the electronic device identifier. Selecting the second synchronization file from the first electronic device may comprise: obtaining the second identifier of the second electronic device and a first time when a previous synchronization is performed with the second electronic device; obtaining third synchronization files among the local synchronization files whose file source information comprises the second identifier, and a latest modification time of each of the third synchronization files; and determining, as the second synchronization file, a synchronization file from the third synchronization files whose latest modification time is later than the first time.

According to another embodiment of the present disclosure, the synchronization file may have an attribute field for recording an attribute of the file, the file source information may comprise the file attribute, and the electronic devices each may have a device attribute. In this case, selecting the second synchronization file from the first electronic device may comprise: obtaining the device attribute of the second electronic device and a first time when a previous synchronization is performed with the second electronic device; obtaining third synchronization files among the local synchronization files whose file attribute matches the device attribute of the second electronic device, and a latest modification time of each of the third synchronization files; and determining, as the second synchronization file, a synchronization file from the third synchronization files whose latest modification time is later than the first time.

According to the above processes, it is possible to synchronize only the files which have been changed (including added files and modified files) to the second electronic device again, so as to further improve the efficiency.

The electronic devices each may have a limited space for saving the synchronization files. Thus, there may be a problem of not having enough space for each synchronization. According to an embodiment of the present disclosure, in order to avoid the failure of the synchronization due to insufficient space, the first synchronization operation may comprise: performing the first interacting operation with the second electronic device for determining a size of the first synchronization file; determining whether a remaining storage capacity of a storage module for storing the synchronization files is larger than or equal to the size of the first synchronization file; directly synchronizing the first synchronization file from the second electronic device to the first electronic device and recording the first piece of file source information, when the remaining storage capacity is larger than or equal to the size of the first synchronization file; and deleting a part or all of the synchronization files existing in the storage module according to a preset policy until the remaining storage capacity is larger than or equal to the size of the first synchronization file, and subsequently synchronizing the first synchronization file to the first electronic device and recording the first piece of file source information, when the remaining storage capacity is less than the size of the first synchronization file.

The preset policy may comprise: preferentially deleting a file earliest synchronized to the first electronic device, according to a temporal order of being synchronized to the first electronic device; or preferentially deleting a file least frequently used, according to a usage frequency of the synchronization files; or preferentially deleting a file whose source electronic device has a lowest priority, according to priorities of source electronic devices of the synchronization files.

However, the deleting operation as described above may cause deletion of some important files, such as some financial information, some meaningful pictures and the like. According to an embodiment of the present disclosure, the synchronization files each may have a respective piece of reservation information for identifying whether the synchronization file needs to be reserved or not. Synchronization file(s) deleted in the operation of deleting the part or all of the synchronization files existing in the storage module according to the preset policy may comprise a file whose reservation information indicates that the file needs not to be reserved.

According to an embodiment of the present disclosure, data exchange may occur during each synchronization. It is possible that different synchronizations are performed between different electronic devices. According to an embodiment of the present disclosure, in order for convenience management (such as deletion, modification, and obtaining of synchronization time) of the synchronization files by the user, the method may further comprise: recording synchronization information of the current synchronization operation after the synchronization is completed.

Here, the synchronization information may comprise: a file name of the synchronized file, a synchronization type (synchronizing from the local device to another electronic device or from another electronic device to the local device), a time when the synchronization occurs, an identifier of a corresponding electronic device and the like in the current synchronization process.

Of course, the above are only examples of the synchronization information. The synchronization information may further comprise other information such as a storage position, information on the file itself and the like.

The user may conveniently manage the synchronization files by the information as illustrated above, e.g., viewing the synchronization files according to the file source, viewing the synchronization files according to the synchronization time, and viewing the synchronization file according to the synchronization type and so on.

Figure 2:
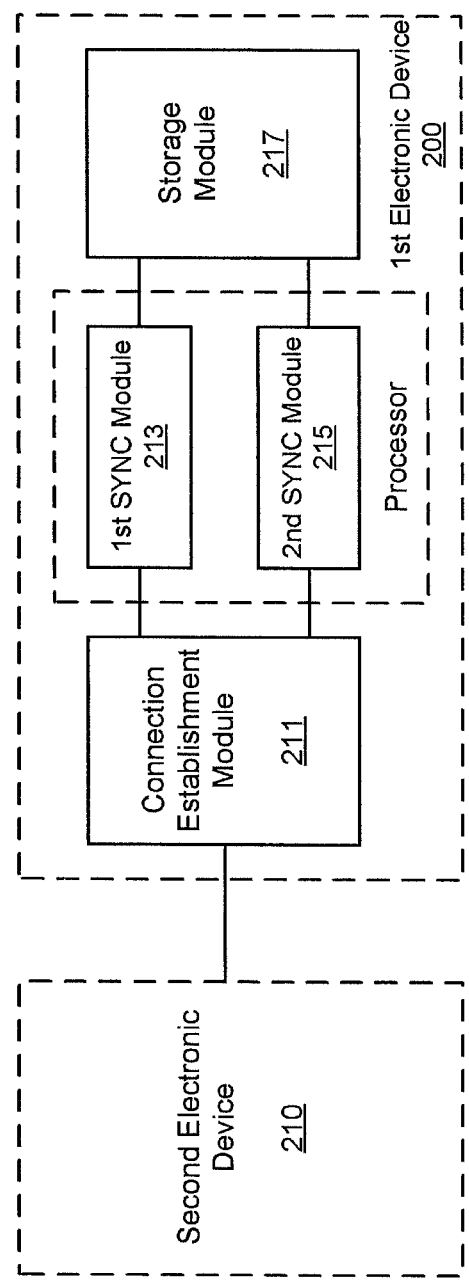
FIG. 2 is a schematic diagram showing an electronic device according to an embodiment of the present disclosure.

FIG. 1 shows a file synchronization apparatus 100 for use in a first electronic device 200 according to an embodiment of the present disclosure. FIG. 2 shows a second electronic device and the first electronic device according to an embodiment of the present disclosure. Hereinafter, embodiments of the present disclosure will be described in connection with FIGS. 1 and 2.

As shown in FIG. 1, the file synchronization apparatus 100 may comprise: a connection establishment module 101 configured to establish a connection with the second electronic device; and a synchronization module 102.

The synchronization module 102 may be configured to interact with the second electronic device 210, so as to synchronize a first synchronization file from the second electronic device to the first electronic device 200, and to record a first piece of file source information for the first synchronization file, wherein the first piece of file source information is configured to identify that the first synchronization file comes from the second electronic device 210.

Alternatively or additionally, the synchronization module 102 may be configured to select a second synchronization file from the first electronic device 200, and interact with the second electronic device 210, so as to synchronize the second synchronization file to the second electronic device 210, wherein the second synchronization file includes a second piece of file source information configured to identify that the second synchronization file corresponds to the second electronic device 210.

According to an embodiment, the file source information for the local synchronization files in the first electronic device 200 may comprise an electronic device identifier. A module for selecting the second synchronization file from the first electronic device 200 may comprise: a first obtaining unit, configured to obtain a second identifier of the second electronic device; and a first determination unit, configured to determining, as the second synchronization file, a synchronization file among the local synchronization files whose file source information comprises the second identifier.

According to a further embodiment, the file source information for the local synchronization files in the first electronic device may comprise an electronic device identifier. The module for selecting the second synchronization file from the first electronic device may comprise: a second obtaining unit, configured to obtain a second identifier of the second electronic device and a first time when a previous synchronization is performed with the second electronic device; a third obtaining unit, configured to obtain third synchronization files among the local synchronization files whose file source information corresponds to the second identifier, and a latest modification time of each of the third synchronization files; and a second determination unit, configured to determine, as the second synchronization file, a synchronization file from the third synchronization files whose latest modification time is later than the first time.

According to a further embodiment, the synchronization file may have an attribute field for recording an attribute of the file, the file source information may comprise the file attribute, and the electronic devices each may have a device attribute. In this case, the module for selecting the second synchronization file from the first electronic device may comprise: a fourth obtaining unit, configured to obtain the device attribute of the second electronic device; and a third determination unit, configured to determine, as the second synchronization file, a synchronization file among the local synchronization files whose file attribute matches the device attribute of the second electronic device.

According to an embodiment of the present disclosure, the file synchronization apparatus 100 may further comprise: a synchronization information recording module, configured to record synchronization information for the current synchronization operation after the synchronization is completed.

As shown in FIG. 2, the first electronic device 200 according to an embodiment of the present disclosure may comprise: a connection establishment module 211, configured to establish a connection with the second electronic device; a storage module 217; a processor including a first synchronization module 213 and/or a second synchronization module 215.

The first synchronization module 213 may be configured to interact with the second electronic device 210 via a connection established by the connection establishment module so as to synchronize a first synchronization file from the second electronic device 210 to the storage module 217 of the first electronic device, and to record a first piece of file source information for the first synchronization file, wherein the first piece of file source information is configured to identify that the first synchronization file comes from the second electronic device 210.

The second synchronization module 215 may be configured to select a second synchronization file from the storage module 217, and interact with the second electronic device via the connection established by the connection establishment module 101, so as to synchronize the second synchronization file to the second electronic device, wherein the second synchronization file includes a second piece of file source information configured to identify that the second synchronization file corresponds to the second electronic device 210.

According to an embodiment of the present disclosure, the connection establishment module 101 may comprise a module configured to establish a wired connection, such as a wired network card, and/or a module configured to establish a wireless connection, such as a Bluetooth communication module, an infrared communication module and the like. Here, the descriptions thereof are omitted.

The storage module 217 may store the synchronization files. The storage module may comprise a built-in memory, a hard disk drive and the like. Also, the storage module may comprise an external storage, such as a USB based hard disk drive, a flash memory and the like, which can be connected to a main board of the electronic device via a USB interface.

According to embodiments of the present disclosure, the various modules may be implemented by software, for execution by various types of processors. For example, an identified executable code module may comprise one or more physical or logic blocks of computer instructions. For example, it may be constructed as an object, a process or a function. However, the executable codes of the identified module need not to be placed together physically, but may comprise different instructions stored in different positions. When these instructions are put together logically, they construct a module and may implement a prescribed purpose of the module.

As a matter of fact, the executable code module may comprise a single instruction or a plurality of instructions, and may even be distributed over different code segments, over different programs or across a plurality of storage devices. Similarly, operation data may be identified in the module, and may be implemented in any appropriate form and be organized in any appropriate type of data structure. The operation data may be collected as a single data set, or may be distributed over different positions (including different storage devices), and may at least partly exist in the system or network only as electronic signals.

For the modules which can be implemented by software, those skilled in the art may build corresponding hardware circuits to implement corresponding functions thereof, considering current hardware manufacture processes and without considering the costs thereof. The hardware circuits may comprise Very Large Scale Integration (VLSI) circuits or gate arrays, and semiconductor devices such as logic chips, transistors or other discrete devices. The modules may also be implemented by programmable hardware devices such as Field Programmable Gate Arrays, Programmable Array Logics, Programmable Logic devices and the like.

The present disclosure has been described above with reference to the embodiments thereof. It should be understood that various modifications and alternations can be made by those skilled in the art without departing from the spirits and scope of the present disclosure. Therefore, the scope of the present disclosure is not limited to the above particular embodiments but only defined by the claims as attached.

We claim:

1. A file synchronization method for a first electronic device, the method comprising:
    establishing a connection with a second electronic device; and
    performing a first synchronization operation and a second synchronization operation,
    wherein the first synchronization operation comprises: interacting with the second electronic device so as to synchronize a first synchronization file from the second electronic device to the first electronic device, and to record a first piece of file source information for the first synchronization file, wherein the first piece of file source information is configured to identify that the first synchronization file comes from the second electronic device, and
    wherein the second synchronization operation comprises: selecting a second synchronization file from the first electronic device, and interacting with the second electronic device, so as to synchronize the second synchronization file to the second electronic device, wherein the second synchronization file includes a second piece of file source information configured to identify that the second synchronization file corresponds to the second electronic device.

2. The file synchronization method according to claim 1, wherein the file source information for local synchronization files in the first electronic device comprises an electronic device identifier, and selecting the second synchronization file from the first electronic device comprises:
    obtaining an identifier of the second electronic device; and
    determining, as the second synchronization file, a local synchronization file among the local synchronization files whose file source information comprises the identifier of the second electronic device.

3. The file synchronization method according to claim 1, wherein the file source information for local synchronization files in the first electronic device comprises an electronic device identifier, and selecting the second synchronization file from the first electronic device comprises:
    obtaining an identifier of the second electronic device and a first time when a previous synchronization is performed with the second electronic device;
    obtaining third synchronization files among the local synchronization files whose file source information comprises the identifier of the second electronic device, and a latest modification time of each of the third synchronization files; and
    determining, as the second synchronization file, a synchronization file from the third synchronization files whose latest modification time is later than the first time.

4. The file synchronization method according to claim 1, wherein the synchronization file has an attribute field for recording an attribute of the file, the file source information comprises the file attribute, and the electronic devices each have a device attribute, and wherein selecting the second synchronization file from the first electronic device comprises:
    obtaining the device attribute of the second electronic device; and
    determining, as the second synchronization file, a synchronization file among local synchronization files whose file attribute matches the device attribute of the second electronic device.

5. The file synchronization method according to claim 1, wherein interacting with the second electronic device so as to synchronize the first synchronization file from the second electronic device to the first electronic device, and to record the first piece of file source information for the first synchronization file comprises:
    interacting with the second electronic device so as to obtain an identifier of the second electronic device and the first synchronization file; and
    saving the first synchronization file, and recording a correspondence between the first synchronization file and the identifier of the second electronic device.

6. The file synchronization method according to claim 1, wherein the first synchronization operation comprises:
    performing the first interacting operation with the second electronic device to determine a size of the first synchronization file;
    determining whether a remaining storage capacity of a storage module for storing the synchronization files is larger than or equal to the size of the first synchronization file;
    directly synchronizing the first synchronization file from the second electronic device to the first electronic device and recording the first piece of file source information, when the remaining storage capacity is larger than or equal to the size of the first synchronization file; and
    deleting a part or all of the synchronization files existing in the storage module according to a preset policy until the remaining storage capacity is larger than or equal to the size of the first synchronization file, and subsequently synchronizing the first synchronization file to the first electronic device and recording the first piece of file source information, when the remaining storage capacity is less than the size of the first synchronization file.

7. The file synchronization method according to claim 6, wherein the preset policy comprises:
preferentially deleting a file earliest synchronized to the first electronic device, according to a temporal order of being synchronized to the first electronic device; or
preferentially deleting a file least frequently used, according to a usage frequency of the synchronization files; or
preferentially deleting a file whose source electronic device has a lowest priority, according to priorities of source electronic devices of the synchronization files.

8. The file synchronization method according to claim 6, wherein the synchronization files each have a respective piece of reservation information for identifying whether the synchronization file needs to be reserved or not, and synchronization file(s) deleted in the operation of deleting the part or all of the synchronization files existing in the storage module according to the preset policy comprise(s) a file whose reservation information indicates that the file needs not to be reserved.

9. The file synchronization method according to claim 1, further comprising:
recording synchronization information of the current synchronization operation after the synchronization is completed.

10. A file synchronization apparatus for use in a first electronic device, the file synchronization apparatus comprising:
a connection establishment module, configured to establish a connection with a second electronic device; and
a synchronization module, configured to
interact with the second electronic device so as to synchronize a first synchronization file from the second electronic device to the first electronic device, and to record a first piece of file source information for the first synchronization file, wherein the first piece of file source information is configured to identify that the first synchronization file comes from the second electronic device; and
select a second synchronization file from the first electronic device, and interact with the second electronic device, so as to synchronize the second synchronization file to the second electronic device, wherein the second synchronization file includes a second piece of file source information configured to identify that the second synchronization file corresponds to the second electronic device.

11. The file synchronization apparatus according to claim 10, wherein the file source information for local synchronization files in the first electronic device comprises an electronic device identifier, and the synchronization module is configured to:
obtain a second identifier of the second electronic device; and
determine, as the second synchronization file, a synchronization file among the local synchronization files whose file source information comprises the second identifier.

12. The file synchronization apparatus according to claim 10, wherein the file source information for local synchronization files in the first electronic device comprises an electronic device identifier, and the synchronization module is configured to:
obtain a second identifier of the second electronic device and a first time when a previous synchronization is performed with the second electronic device;
obtain third synchronization files among the local synchronization files whose file source information comprises the second identifier, and a latest modification time of each of the third synchronization files; and
determine, as the second synchronization file, a synchronization file from the third synchronization files whose latest modification time is later than the first time.

13. The file synchronization apparatus according to claim 10, wherein the synchronization file has an attribute field for recording an attribute of the file, the file source information comprises the file attribute, and the electronic devices each have a device attribute, and wherein the synchronization module is configured to:
obtain the device attribute of the second electronic device; and
determine, as the second synchronization file, a synchronization file among local synchronization files whose file attribute matches the device attribute of the second electronic device.

14. The file synchronization apparatus according to claim 10, the synchronization module is configured to record synchronization information of the current synchronization operation after the synchronization is completed.

15. An electronic device, comprising:
a connection establishment module, configured to establish a connection with a further electronic device;
a storage module; and
a processor including a first synchronization module and a second synchronization module, wherein
the first synchronization module is configured to interact with the further electronic device via a connection established by the connection establishment module so as to synchronize a first synchronization file from the further electronic device to the storage module, and to record a first piece of file source information for the first synchronization file, wherein the first piece of file source information is configured to identify that the first synchronization file comes from the further electronic device; and
the second synchronization module is configured to select a second synchronization file from the storage module, and interact with the further electronic device via the connection established by the connection establishment module, so as to synchronize the second synchronization file to the further electronic device, wherein the second synchronization file has a second piece of file source information configured to identify that the second synchronization file corresponds to the further electronic device.

* * * * *